United States Patent [19]
Pase

[11] Patent Number: 5,900,023
[45] Date of Patent: May 4, 1999

[54] METHOD AND APPARATUS FOR REMOVING POWER-OF-TWO RESTRICTIONS ON DISTRIBUTED ADDRESSING

[75] Inventor: Douglas M. Pase, Esopus, N.Y.

[73] Assignee: Cray Research Inc., Eagan, Minn.

[21] Appl. No.: 08/673,436

[22] Filed: Jun. 28, 1996

[51] Int. Cl.⁶ .................................................. G06F 12/00
[52] U.S. Cl. ........................ 711/220; 711/217; 711/219; 364/765
[58] Field of Search ..................................... 711/217, 219, 711/220, 5; 364/765; 345/706, 553

[56] References Cited

U.S. PATENT DOCUMENTS

| | | | |
|---|---|---|---|
| 3,777,132 | 12/1973 | Bennett, Jr. .............................. | 364/765 |
| 5,434,995 | 7/1995 | Oberlin et al. ........................... | 395/553 |
| 5,581,705 | 12/1996 | Passint et al. ...................... | 395/200.13 |
| 5,586,325 | 12/1996 | MacDonald et al. .................... | 395/706 |
| 5,696,922 | 12/1997 | Fromm ....................................... | 711/5 |

OTHER PUBLICATIONS

Robert Alverson, "Integer Division Using Reciprocals", Proceedings 10th Symposuim on Computer Arithmetic, pp. 186–190 (Jun. 1991).

Robert Alverson, "Integer Division Using Reciprocals", *Proceedings 10th Symposium on Computer Arithmetic*, pp. 186–190, (Jun., 1991).

Ehud Artzy, et al., "A Fast Division Technique for Constant Divisors", *Communications of the ACM*, pp. 98–101, (Feb., 1976).

Henry G. Baker, "Computing A*B (Mod N) Efficiently in Ansi C", *ACM Sigplan Notices*, pp. 95–98, (Jan., 1992).

Robert Bernstein, "Multiplication by Integer Constants", *Software—Practice and Experience*, pp. 641–652, (Jul., 1986).

Raymond T. Boute, "The Euclidean Definition of the Functions Div and Mod", *ACM Transactions on Programming Languages and Systems*, pp. 127–144, (Apr., 1992).

A.P. Chang, "A Note on the Modulo Operation", pp. 19–23, (Apr., 1995).

Torbjorn Granlund, et al., "Division by Invariant Intergers Using Multiplication", pp. 61–72, (1994).

David H. Jacobsohn, "A Combinatoric Division Algorithm for Fixed–Integer Divisors", *IEEE Transactions on Computers*, pp. 608–610, (Jun., 1973).

(List continued on next page.)

*Primary Examiner*—Eddie P. Chan
*Assistant Examiner*—T. V. Nguyen
*Attorney, Agent, or Firm*—Schwegman, Lundberg, Woessner & Kluth, P.A.

[57] ABSTRACT

An efficient integer-division-by-an-constant method and apparatus. This integer-division-by-an-constant is useful in calculations which must be performed often and/or quickly, and where the denominator is fixed for the calculations, such as address calculations in massively parallel, distributed memory processor systems. Also described is a method and apparatus using the integer-division-by-an-constant method and apparatus, which facilitates removing power-of two restrictions on the reorganization and redistribution of data between remote and local memory blocks in a massively parallel, distributed-memory processing system. The flexible addressing scheme provided supports data organizations which vary widely depending on the processing task. In particular, a plurality of processing elements (PEs) operating in parallel within a subset of all the PEs in a massively parallel processor system, may simultaneously operate on an array data structure, the array data structure having an arbitrary size and shape. Different data organizations in memory are supported by a processing element (PE) internal array address having certain index ranges designated as the target PE number and the areas within those index ranges designating the offset within that PE's local memory. The index ranges and areas are distributed throughout the PE internal array address to achieve various data distributions throughout memory.

20 Claims, 7 Drawing Sheets

OTHER PUBLICATIONS

Shuo–Yen Robert Li, "Fast Constant Division Routines", *IEEE Transactions on Computers,* pp. 866–869, (Sep., 1985).

Daniel J. Magenheimer, "Integer Multiplication and Division on the HP Precision Architecture", In Proceedings Second International Conference on Architectural Support for Programming Languages and Operating Systems, pp. 90–99, (Oct., 1978).

| DISTRIBUTION ACROSS 4 PEs | | | | | | | | | | | | |
|---|---|---|---|---|---|---|---|---|---|---|---|---|
| PE0 | | | | PE1 | | | | PE2 | | | | PE3 |
| 1 | 5 | 9 | 13 | 2 | 6 | 10 | · | 3 | 7 | 11 | · | 4 | 8 | 12 | · |

FIG. 3A

| DISTRIBUTION ACROSS 4 PEs | | | | | | | | | | | | |
|---|---|---|---|---|---|---|---|---|---|---|---|---|
| PE0 | | | | PE1 | | | | PE2 | | | | PE3 |
| 1 | 2 | 9 | 10 | 3 | 4 | 11 | 12 | 5 | 6 | 13 | · | 7 | 8 | · | · |

FIG. 3B

| DISTRIBUTION ACROSS 4 PEs | | | | | | | | | | | | |
|---|---|---|---|---|---|---|---|---|---|---|---|---|
| PE0 | | | | PE1 | | | | PE2 | | | | PE3 |
| 1 | 2 | 3 | 4 | 5 | 6 | 7 | 8 | 9 | 10 | 11 | 12 | 13 | · | · | · |

FIG. 3C

| DISTRIBUTION ACROSS 4 PEs | | | | | | | | | | | | |
|---|---|---|---|---|---|---|---|---|---|---|---|---|
| PE0 | | | | PE1 | | | | PE2 | | | | PE3 |
| 1,1 | 1,2 | 1,3 | 1,4 | 1,5 | 1,6 | 1,7 | 1,8 | 1,9 | 1,10 | 1,11 | 1,12 | 1,13 | · | · | · |
| 2,1 | 2,2 | 2,3 | 2,4 | 2,5 | 2,6 | 2,7 | 2,8 | 2,9 | 2,10 | 2,11 | 2,12 | 2,13 | · | · | · |

FIG. 3D

|   | 1 | 2 | 3 | 4 | 5 | 6 | 7 | 8 |
|---|---|---|---|---|---|---|---|---|
| 1 | PE0 | | PE4 | | PE8 | | PE12 | |
| 2 | | | | | | | | |
| 3 | PE1 | | PE5 | | PE9 | | PE13 | |
| 4 | | | | | | | | |
| 5 | PE2 | | PE6 | | PE10 | | PE14 | |
| 6 | | | | | | | | |
| 7 | PE3 | | PE7 | | PE11 | | PE15 | |
| 8 | | | | | | | | |

FIG. 3E

| | PE 0 | PE P | EP N-1 |
|---|---|---|---|
| 0 | L,L+1,L+2,...,L+B-1 | L+PB,...,L+(P+1)B-1 | L+(N-1)B,...,L+NB-1 |
| 1 | L+NB,...,L+(N+1)B-1 | L+(N+P)B,...,L+(N+P+1)B-1 | L+(2N-1)B,...,L+2NB-1 |
| ⋮ | ⋮ | ⋮ | ⋮ |
| k-1 | L+(k-1)NB,...,L+((k-1)N+1)B-1 | L+((k-1)N+P)B,...,L+((k-1)N+P+1)B-1 | U-B+1,U-B+2,...,U-2,U-1,U |

WHERE $k = \lceil (1+U-L)/(BN) \rceil$

FIG. 5

METHOD AND APPARATUS FOR REMOVING POWER-OF-TWO RESTRICTIONS ON DISTRIBUTED ADDRESSING

FIELD OF THE INVENTION

The present invention relates generally to massively parallel processing systems, and more particularly to a division method which facilitates the addressing, reorganization, and redistribution of blocks of data between global and local memory in a massively parallel distributed-memory processing system.

BACKGROUND OF THE INVENTION

In the past, one of the typical approaches to speeding up a computer division-by-a-constant operation has used a reciprocal multiply operation to replace the division operation for floating-point numbers. In such an environment, one can use a number of approaches to achieve good accuracy (e.g., one can use a couple of "Newton-Raphson iterations" to correct the result to a precision of within ±1 unit-in-the-last-place (ULP)). Floating-point precision is often measured in terms of ULP of the fractions, since the significance of that bit depends on the exponent. Floating-point results are also typically scaled and/or truncated automatically such that the maximum number of bits and accuracy are maintained all the time.

In integer division, however, situations often require a precision which does not allow the result to be off by one (results accurate to ±1 ULP are not sufficiently accurate). Also, scaling operations are not performed automatically. In integer division, there is no convenient representation of the reciprocal of an arbitrarily-sized integer, therefore the computer designer must take into account scaling, and must provide an method and apparatus which provide an exact result, since certain algorithms cannot afford a result which is off by one.

One area which requires exact results from an integer divide is in the placement and addressing of elements in an array which is being processed by a massively parallel processor.

Massively parallel processing involves the utilization of many thousands of processing elements (PEs) linked together by high-speed interconnect networks. A distributed memory processing system is one wherein each processor has a favored low-latency, high-bandwidth path to a group of local memory banks, and a longer-latency, lower-bandwidth access path to the memory banks associated with other processors (remote or global memory) over the interconnect network. Even in shared-memory systems in which all memory is directly addressable by any processor in the system, data residing in a processor's local memory can be accessed by that processor much faster than can data residing in the memory local to another processor. This significant difference in performance between access to local memory and access to remote memory prompts the performance-conscious programmer to strive to place any data to be accessed by a processor over the course of a program into local memory.

The need to efficiently move blocks of data between local and remote or global memory becomes even more apparent when attempting performance optimization using cache memory. Spacial coherence, i.e., the tendency for successive references to access data in adjacent memory locations, plays a major role in determining cache performance. Poor spacial coherence may exist if the access sequence to a data structure is accomplished via a large stride (e.g., when accessing a two dimensional Fortran array by rows) or in a random or sparse fashion (e.g., indirect accesses or irregular grids). To achieve good performance, data often must be rearranged from a multitude of different large-stride or sparse organizations, each dependent on the task to be performed, into a unit-stride organization, in addition to being moved between remote and local memory.

There is a need in the art for a mechanism which supports a flexible addressing scheme and facilitates the redistribution of data between local- and global-memory blocks in a massively parallel, distributed-memory processing system. The addressing support mechanism should allow scatter-gather capabilities in addition to constant-stride capabilities in order to facilitate reorganization of sparse or randomly organized data. The mechanism should also be easily directed by the user for adaptation to different types of processing tasks.

In particular, there is a need in the art to remove power-of-two restrictions from the placement of data arrays across various PEs in a MPP system while retaining fast address calculation. For example, it is relatively easy and efficient to distribute the data of a 16-by-32-by-64 array across a three-dimensional torus MPP because each ordinate is an integer power of two, but relatively difficult and/or inefficient to distribute the data of a 17-by-33-by-65 array across such an MPP (to do so, the computer scientist often resorts to an array at the next larger power-of-two in each dimension, i.e., a 32-by-64-by-128 array, which wastes memory space).

In the system described in patent application Ser. No. 08/165,118 filed Dec. 10, 1992 now U.S. Pat. No. 5,765,181, and assigned to the assignee of the present invention, which is incorporated herein by reference, there is described hardware and process which provides a hardware address centrifuge to facilitate the reorganization and redistribution of data between remote and local memory blocks in a massively parallel distributed-memory processing system. In order to operate efficiently, however, data arrays must be placed on power of two boundaries. That allows one to calculate PE number and offset by simple bit manipulation. In one such embodiment of that invention, the bits comprising an index or address into a vector array are separated into two sets of bits, a first set comprising the PE number, and a second set comprising an offset into a portion of the memory of a PE. In order to spread the references, the bits of the first set and the bits of the second set are interspersed within the array index. The address centrifuge is used to separate the two sets of bits and to "squeeze" out the spaces between the separated bits, thus resulting in a PE number and an offset.

None of the prior art provides a convenient and fast way to provide a divide-by-a-constant. None of the prior art provides a convenient and fast way to eliminate the power-of-two restriction on array addresses being processed by a plurality of processors.

SUMMARY OF THE INVENTION

To overcome limitations in the art described above and to overcome other limitations that will become apparent upon reading and understanding the present specification, the present invention provides an efficient integer-division-by-an-constant method and apparatus. This integer-division-by-an-constant is useful in calculations which must be performed often and/or quickly, and where the denominator is fixed for the calculations. Also described is a method and apparatus using the integer-division-by-an-constant method and apparatus, which facilitates removing power-of two restrictions on the reorganization and redistribution of data between remote and local memory blocks in a massively parallel, distributed-memory processing system.

A flexible addressing scheme is provided which supports data organizations which vary widely depending on the processing task. In particular, a plurality of processing elements (PEs) operating in parallel within a subset of all the PEs in a massively parallel processor system, may simultaneously operate on an array data structure, the array data structure having an arbitrary size and shape. Different data organizations in memory are supported by a processing element (PE) internal array address having certain index ranges designated as the target PE number and the areas within those index ranges designating the offset within that PE's local memory. The index ranges and areas are distributed throughout the PE internal array address to achieve various data distributions throughout memory.

When a transfer occurs, the PE number bits are extracted via a "division address centrifuge" which takes an array address as an input, and generates two outputs: a PE number and an offset. In one embodiment, a software-supplied "mask" specifies to the division address centrifuge the mapping of the input array address into the two outputs. The division address centrifuge can be utilized in an asynchronous direct memory access controller to actually perform the block transfers, or it can also be used by processor to produce division-address-centrifuged results directly on the processor generated addresses in which block transfer control is accomplished through several memory-mapped control registers. The division address centrifuge allows scatter-gather reference patterns to be employed as well as constant-stride capabilities and is easily adaptable by the user to fit a wide variety of processing tasks.

The ability to arbitrarily define, via a software-supplied mask, which index ranges in the index address are to be interpreted as PE number or offset address provides direct support for the programming need to arrange data in memory in the optimum organization which results in the most efficient processing of the data for each particular processing task. The division address centrifuge allows the user to achieve any organization through the simple mechanism of a software-supplied mask and results in an extremely flexible and easy-to-use mechanism to move and arrange data throughout the system memory.

BRIEF DESCRIPTION OF THE DRAWINGS

In the following detailed description of the invention, reference is made to the accompanying drawings which form a part hereof, and in which is shown by way of illustration only, specific exemplary embodiments in which the invention may be practiced. It is to be understood that other embodiments may be utilized, and structural changes may be made, without departing from the scope of the present invention.

FIGS. 3A–E are examples of array element distributions for given data distribution selections.

FIG. 5 shows a mapping of the distribution of elements in an element array, the elements distributed across N processing elements.

DETAILED DESCRIPTION OF THE PREFERRED EMBODIMENT

Figure 1:
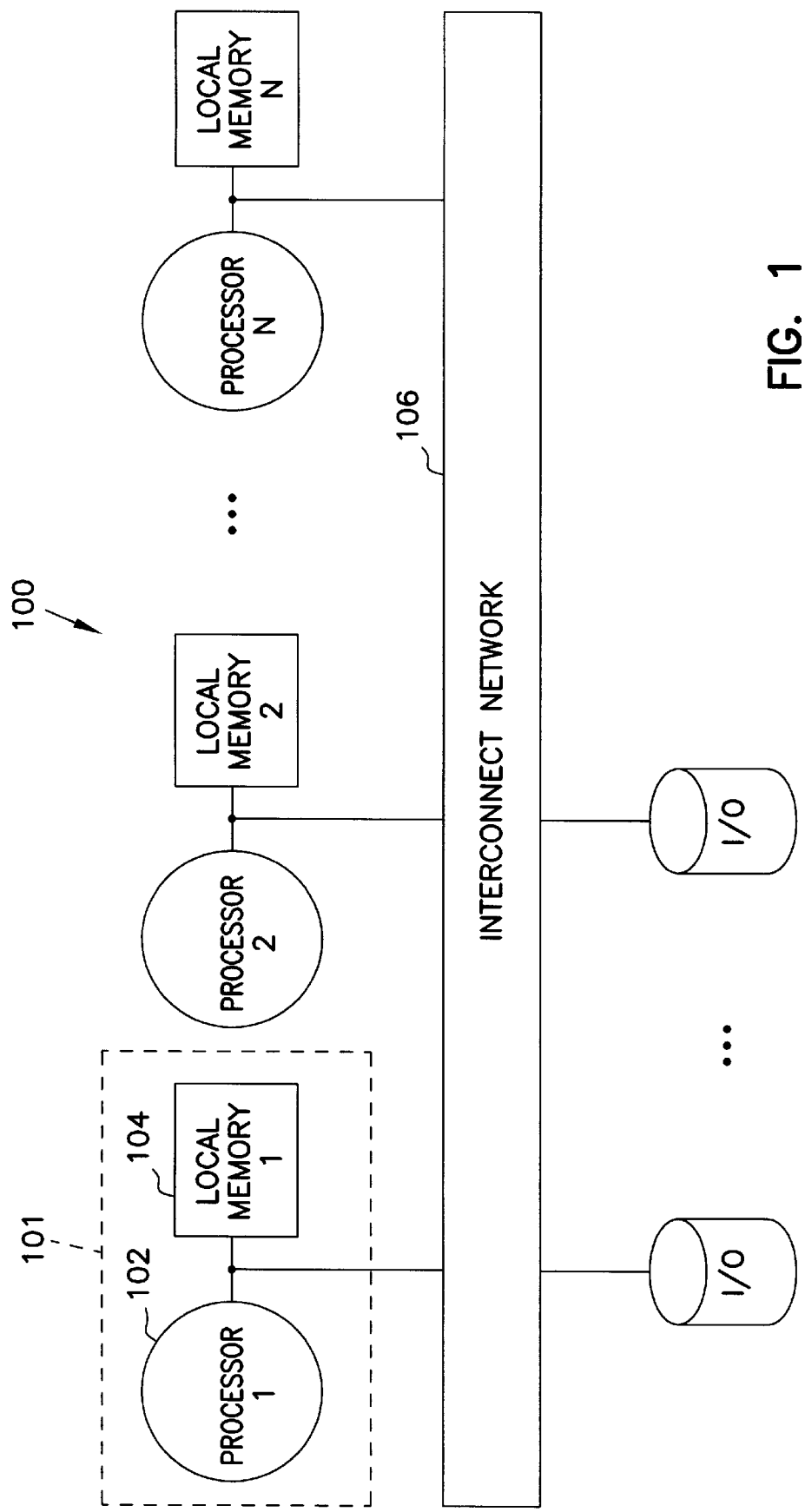
FIG. 1 shows a simplified block diagram of a representative MPP system with which the present division address centrifuge can be used.

In the following detailed description of the preferred embodiment, reference is made to the accompanying drawings which form a part hereof, and in which is shown by way of illustration a specific embodiment in which the invention may be practiced. It is to be understood that other embodiments may be utilized and structural changes made without departing from the scope of the present invention.

It is desirable for data held in arrays or matrices (e.g., a multi-dimensional array $M(x, y, z, t)$) to be distributed among various processors in a distributed-memory multi-processor system, in order that multiple processors can perform operations on different portions of the data simultaneously. A reference to a particular datum in the array, for example $M(x_1, y_1, z_1, t_1)$, must be resolved to (1.) a particular memory location, called an "offset", within (2.) a particular processing entity (PE), which is identified by a "PE number". If the data in the array are distributed in only one dimension (i.e., the X dimension index is decoded to represent a unique PE number), then the other three dimensions are called "degenerate," since the first dimension determines which PE will be used, regardless of what the other indexes are. This leads to a small set of processors, or even a single processor, handling all accesses for the portion of the calculations focusing on a particular index in one dimension.

This can be thought of as representing vertical columns or "stripes" of data on each processor, rather than multi-dimensional volumes of data. These stripes of data have a very small volume relative to the amount of surface volume around them.

Because of this topology, there is communication (data passing from one PE to another) along all of that surface area (since the adjoining memory is on other PEs. Thus, if the data is distributed in stripes, then the amount of communications required is increased beyond that required if data were distributed over more than one dimension of, e.g., array $M(x, y, z, t)$. By reducing the number and distance of communications required, the efficiency of a computer program running on an MPP is increased.

When accessing data in an array, the multi-dimensional array indices are typically converted into a linear offset into the data structure stored in memory. For example (using unit-sized elements), the $M(x_1, y_1, z_1, t_1)$ element might be linearized into a single array index value as $(t_1 \times S_Z \times S_Y \times S_X) + (z_1 \times S_Y \times S_X) + (y_1 \times S_X) + (X_1)$ into the data structure representing M, which is stored in memory. To support the routing of array-element references in a distributed-memory system, the PE number and offset must be separated from the linearized array index before being applied to the interconnect network.

In one embodiment of the present invention, a block size B is defined wherein the first block of B consecutive elements is placed in one PE, the next block of B elements are placed in the next PE, and so on. Once the Nth processor has had the Nth block of elements placed in it, the process wraps, and the next block of elements is placed in the first PE used. In one such embodiment, the PE number is defined as the integer quotient of the linearized array index divided by (the number of PEs across which the matrix is spread times the block size (N×B)), and the offset is defined as the remainder of that division.

A large speed increase can be had because, for this case of "distributed addressing," the numerator (the number on top) can vary, but the denominator (the number on the bottom) remains invariant, or constant. The speed can be effectively improved even more when the effect of pipelining is taken into account. The present invention thus removes a major impediment from implementing general-case distributions of arrays across multiple processors. In the past, one major reason cited for not implementing and supporting general (i.e., non-power-of-two) distributions has been the fact that up to three or more divide operations were required to compute the addresses, and integer divide operations took much longer than other types of operations, because the divides were done in software. (In the case of one DEC ALPHA microprocessor, integer divides could take more than 200 CPs (clock pulses). Floating-point division is faster, taking approximately 62 CPs, and has sufficient precision for some applications, but with the additional conversions between integer and floating-point representations of the number, this too can be too "expensive" in terms of performance for use in addressing.)

In one embodiment, the present invention provides an integer reciprocal multiply operation which replaces an integer divide operation and yields accurate results if a certain set of conditions apply. In one embodiment, the reciprocal must have as many significant bits as the sum of the significant bits of the numerator and the denominator.

While the notion of using a scaled reciprocal multiply to replace an integer division has been around for a long time, for example using a floating point reciprocal multiply, previous methods have had an unsolved problem of how to handle the least-significant few bits in order to achieve an exact result. Many of the prior approaches are off by one or more in the least significant bits.

The present invention is useful in replacing division operations which divide by a invariant quantity; for example, within in-line code optimizations, and within array address calculations, such as described above. One goal of the present invention is to minimize the number of corrections needed to achieve an exact result, and to make any corrections which are needed simple and fast. For example, if an integer multiply operation takes 23 clock cycles, then the basic reciprocal multiply needed to replace the divide operation costs 23 clock cycles, and any correction requiring another multiply will double that cost of the operation. On an embodiment (e.g., having a particular processor or architecture) in which one dominant time factor in the algorithm is the multiply, elimination of corrections requiring a multiply may be crucial.

One particularly useful application of the present invention is the calculation of the addresses of elements in an array which is being processed by a plurality of processors. The desired result for array address calculations (wherein both arguments are positive integers) is FLOOR(A÷B), wherein the fractional portion of (A÷B) is discarded. (The FLOOR function returns the largest integer which is smaller or equal to its argument. Another corresponding function, the CEILING function, returns the smallest integer which is larger or equal to its argument.) According to the present invention, FLOOR(A÷B)=FLOOR((A×D)÷$2^K$), wherein (D÷$2^K$) is the reciprocal of B, which is exact, depending on choosing values D and K such that this relationship holds for all values of A within a certain range of interest. In one embodiment, ÷$2^K$ is accomplished by using a binary shift by K bits, and the value for D must contain at least as many significant bits as the sum of the number of significant bits in A plus the number of significant bits in B (i.e., $\log_2 A + \log_2 B \leq \log_2 D$). D is calculated as $$=CEILING(2^K \div B)=FLOOR((2^K+B-1) \div B)=FLOOR((2^K-1) \div B)+1.$$

In one embodiment, an ALPHA processor from Digital Equipment Corporation is included in each PE. For this ALPHA, an unsigned-multiply-high (UMULH) operation is available which multiplies two 64-bit integers and keeps only the upper 64 bits of the 128-bit result (thus throwing away the least-significant 64 bits), and a value K=64 is used. The number of significant bits in A plus the number of significant bits in B is tested to ensure that the sum is less than or equal to 64 (i.e., $\log_2 A + \log_2 B \leq \log_2 D \leq 64$); if this condition and certain other conditions hold, then the integer divide operation is replaced by a single UMULH operation, which has an implicit 64-bit shift right in order to retain only the upper 64-bits of the result.

In another embodiment, K is fixed=32, and the upper bound for A is $2^{32}$. In one such embodiment, 64-bit registers are used for integers, and the product A×D must fit within one such 64-bit register. Further, in this embodiment, 64-bit IEEE floating-point arithmetic is available, and D can be computed in floating point values to avoid the even-more expensive call to perform integer division ($sldiv). If it is desired to have the range for A exceed $2^{32}$, long multiplication can be used, which causes the division to be replaced by four multiplication operations, two shift operations, and one XOR operation.

The formulae describing the distribution of addresses of an array Y such that
DIMENSION Y(L:U)
SHARED Y(N:BLOCK(B))
are
HOME(Y(I))=FLOOR((I−L)÷B) mod N
OFFSET(Y(I))=(I−L) mod B+FLOOR((I−L)÷(B×N))×B
wherein
HOME is the PE number,
OFFSET is the offset into the data structure in that PE,
B is the block size,
N is the number of processors allocated to this dimension,
(B and N are always positive integers),
I is the index for which an address is to be generated,
L is the lowest index of the array allocation,
U is the highest index of the array allocation,
FLOOR(a÷b) represents truncated integer division, and
a mod b represents (in positive integers) the remainder of a/b—in positive integers, a mod b is equivalent to a-(FLOOR(a- b)xb)

A first embodiment uses the following expressions:
In the following expressions, d(X) represents the specific D value for divisor X.

| | |
|---|---|
| I' ← I − L | # I' is the normalized dimension index and its lowest value is zero |
| For :BLOCK distributions, this results in | |
| HOME(Y(I)) ← I' × d(B) >> K | # equal to FLOOR(I−L)/B |
| OFFSET(Y(I)) ← I' − HOME(Y(I)) × B | # equal to (I−L) mod B |

-continued

For :BLOCK(1) distributions, this results in

| | |
|---|---|
| HOME(Y(I)) ← I' × d(N) >> K | # equal to (I-L)/N |
| OFFSET(Y(I)) ← I' - HOME(Y(I)) × N | # equal to (I-L) mod N |
| For :BLOCK(B) distributions, this results in | |
| t1 ← I' × d(B) >> K | # equal to (I-L)/B |
| t2 ← t1 × d(N) >> K | # equal to (I-L)/B/N |
| HOME(Y(I)) ← t1 - (t2 × N) | # equal to ((I-L)/B) mod N |
| t3 ← I' - (t1× B) | # equal to (I-L) mod B |
| t4 ← I' × d(B×N) >> K | # equal to (I-L)/(B×N) |
| OFFSET(Y(I)) ← t3 + (t4 × B) | # equal to ((I-L) mod B) + ((I-L)/(B×N))×B |

A second embodiment uses the following expressions:

In the following expressions, d(X) represents the specific D value for divisor X, CVTFI is a function to convert floating point to integer, and CVTIF is a function to convert integer to floating point.

| | |
|---|---|
| I' ← I - L | # I' is the normalized dimension index and its lowest value is zero |
| For :BLOCK distributions, this results in | |
| | # HOME(Y(I)) ← FLOOR(I-L)/B |
| t1 ← I' × d(B) | # equal to (float) (I-L)/B |
| HOME ← CVTFI(t1) | # equal to (int) FLOOR(I-L)/B |
| | # OFFSET(Y(I)) ← (I-L) mod B |
| t2 ← CVTIF(HOME) | # equal to (float) FLOOR(I-L)/B |
| t3 ← t2 × B | # equal to (float) FLOOR(I-L)/B × B |
| t4 ← I' - t3 | # equal to (float) (I-L) mod B |
| OFFSET ← CVTFI(t4) | # equal to (int) (I-L) mod B |
| For :BLOCK(1) distributions, this results in | |
| | # OFFSET(Y(I)) ← FLOOR(I-L)/N |
| t1 ← I' × d(N) | # equal to (float) (I-L)/N |
| OFFSET ← CVTFI(t1) | # equal to (int) FLOOR(I-L)/N |
| | # HOME(Y(I)) ← (I-L) mod N |
| t2 ← CVTIF(OFFSET) | # equal to (float) FLOOR(I-L)/N |
| t3 ← t2 × N | # equal to (float) FLOOR(I-L)/ N × N |
| t4 ← I' - t3 | # equal to (float) (I-L) mod N |
| OFFSET ← CVTFI(t4) | # equal to (int) (I-L) mod N |
| HOME(Y(I)) ← I' × d(N) >> K | # equal to (I-L)/N |
| OFFSET(Y(I)) ← I' - HOME(Y(I)) × N | # equal to (I-L) mod N |
| For :BLOCK(B) distributions, this results in | |
| | # HOME(Y(I)) ← FLOOR(I-L)/ B mod N |
| t1 ← I' × d(B) | # equal to (float) (I-L)/B |
| t2 ← CVTFI(t1) | # equal to (int) FLOOR(I-L)/B |
| t3 ← CVTIF(t2) | # equal to (float) FLOOR(I-L)/B |
| t4 ← I' × d(B × N) | # equal to (float) (I-L)/(B×N) |
| t5 ← CVTFI(t4) | # equal to (int) FLOOR(I-L)/(B×N) |
| t6 ← CVTIF(t5) | # equal to (float) FLOOR(I-L)/ (B×N) |
| t7 ← t6 × N | # equal to (float) FLOOR(I-L)/ (B×N)×N |
| t8 ← t3 - t7 | # equal to (float) FLOOR(I-L)/ B mod N |
| HOME ← CVTFI(t8) | # equal to (int) FLOOR(I-L)/B mod N |
| | # OFFSET(Y(I)) ← (I-L) mod B + FLOOR(I-L)/(B×N) × B |
| t9 ← t6-t3 | # equal to (float) FLOOR(I-L)/ (B×N)-FLOOR(I-L)/B |
| t10 ← t9 × B | # equal to (float) FLOOR(I-L)/ (B×N)-FLOOR(I-L)/B×B |
| t11 ← I' - t10 | # equal to (float) (I-L) mod B + FLOOR(I-L)/(B×N)×B |
| OFFSET ← CVTFI(t4) | # equal to (int) (I-L) mod B + FLOOR(I-L)/(B×N)×B |

In a MPP system, there are two important concepts of distributing data and work across the machine in such a way as to place the work and the data as close together as possible. In one embodiment, the programming model is designed for a so-called "NUMA", or Non-Uniform Memory Access, shared memory machine. The mechanisms in the programming model addressed in this section will be the address calculation which maps array indices to PEs and base offsets, which can be combined into a single global address, and the related problem of mapping DO-loop indices to the PE where some specified data resides.

Data Distribution

The first problem to be tackled is, given some array declaration

DIMENSION A $(L_1:U_1, L_2:U_2, \ldots, L_r:U_r)$
SHARED A $(\alpha_1, \alpha_2, \ldots, \alpha_r)$ where $\alpha_i$ is the distribution pattern for dimension i and is one of BLOCK
BLOCK (M)
:(degenerate distribution)

how does one map the array elements to specific memory locations within the machine? The first observation is that all four distribution patterns are various cases of the BLOCK (M) distribution, varying only in their choice of block size. In each case the block size B is

| | |
|---|---|
| If $\alpha_i$ = BLOCK | $B_i = \lceil (1 + U_i - L_i)/N_i \rceil$ |
| If $\alpha_i$ = BLOCK(M) | $B_i = M$ |
| If $\alpha_i$ = : | $B_i = 1 + U_i - L_i$ | where $N_i$ is the is the number of processors over which the array elements will be distributed in dimension i. A picture of the memory allocation pattern for a one-dimension array is shown in FIG. 1.

Treating every distribution as a BLOCK (M) distribution, the equations for determining the PE on which an element resides (HOME), the offset from the base address (OFFSET), and the function which maps a PE and an offset back to the index which generated them are P=HOME$_A$(I)=$\lfloor$(I-L)/B$\rfloor$mod N W=OFFSET$_A$(I)=(I-L) mod B+$\lfloor$(I-L)/(B×N)$\rfloor$×B I=INDEX$_A$(P,W)=L+$\lfloor$W/B$\rfloor$B×N+B×P+W mod B In these equations A is the distributed array, I is the array index, N is the number of processors, P is the processor number (in the range of 0 to N-1), and W is the offset from P's base address of the array.

In multidimensional arrays each of the dimensions can be treated independently. The N processors available to the whole array are effectively partitioned into an $N_1 \times N_2 \times \ldots \times N_r$ torus, where r is the rank of the array to be distributed. The dimensions can be treated independently, in part because each dimension is padded to fit exactly on the processors allocated to it. In effect, for the $j^{th}$ dimension $P_j$=HOME$_{A(j)}$($I_j$)=$\lfloor$($I_j$-$L_j$)/$B_j$$\rfloor$mod $N_j$ $W_j$=OFFSET$_{A(j)}$($I_j$)=($I_j$-$L_j$) mod $B_j$+$\lfloor$($I_j$-$L_j$)/($B_j \times N_j$)$\rfloor$$B_j$ $I_j$=INDEX$_{A(j)}$($P_j$,$W_j$)=$L_j$+$\lfloor$$W_j$/$B_j$$\rfloor$$B_j \times N_j$+$B_j \times P_j$+$W_j$ mod $B_j$ Of course the various PE and offset values for each dimension must be reduced to a single PE value and a single offset value, which is done by the next two equations.

$$P = \text{HOME}_A(\vec{I}) = \sum_{j=1}^{r} \left( P_J \prod_{k=1}^{j-1} N_k \right)$$

$$W = \text{OFFSET}_A(\vec{I}) = \sum_{j=1}^{r} \left( W_J \prod_{k=1}^{j-1} \left\lceil \frac{1 + U_k - L_k}{N_k} \right\rceil \right)$$

Since the processor space is reshaped (from linear to toroidal), we also need a transformation from the linear space to the torus, which is given in the next equation.

$$P_j = \left\lfloor \frac{P}{\prod_{K=1}^{J-1} N_k} \right\rfloor \mod N_j$$

FIG. 5 shows a representation of a :BLOCK(B) distribution of elements from a one-dimensional array across N PEs, each PE having k blocks of elements (where k=CEILING ((1+U−L)/(B×N))), and each block having B consecutive elements from the array, and each consecutive block placed in a different PE. L represents the lower bound for the index for the elements, and U represents the upper bound for the index for the elements. Referring to FIG. 5, PE0 holds the first block of B elements having the consecutive element indices between L and L+B−1, the N+1$^{th}$ block of B elements having the consecutive element indices between L+NB and L+(N+1)B−1, other blocks, and the block of B elements having the consecutive element indices between L+(k−1)NB and L+(k−1)N+1)B−1. Such a distribution of elements spreads the elements while keeping blocks of B elements together in one processor.

The preferred MPP system, for which the present invention provides a division address centrifuge, is a MIMD massively parallel multiprocessor with a physically distributed, globally addressable memory. The description of distributing data elements of one array across a subset plurality of PEs in the toroidal mesh of MPP system 100, and another type of address centrifuge related to the present invention is detailed in the patent application "Apparatus and Method of Addressing Distributed Memory Within a Massively Parallel Processing System," Ser. No. 08/165,118, filed Dec. 10, 1993 by Oberlin et al., which is hereby incorporated by reference.

A representative MPP system 100 is shown in FIG. 1. In one embodiment, MPP system 100 contains hundreds or thousands of processors, each accompanied by a local memory and associated support circuitry. Each processor, local memory and support circuitry component is called a processing element (PE). The PE's in the MPP system 100 are linked via an interconnect network.

The preferred MPP system 100 has a physically distributed memory, wherein each processor has a favored, low-latency, high-bandwidth path to a local memory, and a longer-latency, lower-bandwidth access to the memory banks associated with other processors over the interconnect network. In one preferred embodiment, the interconnect network is comprised of a 3-dimensional torus which when connected creates a 3-dimensional matrix of PEs. The torus design has several advantages, including speed of information transfers, relatively short communications paths, and the ability to circumnavigate failed communication links. The interconnect network is also scalable in all three dimensions. An interconnect network of this nature is described in more detail in the copending and commonly assigned U.S. patent application Ser. No. 07/983,979, entitled "Direction Order Routing in Multiprocessing Systems", to Gregory M. Thorsen, filed Nov. 30, 1992, which is incorporated herein by reference.

Figure 2:
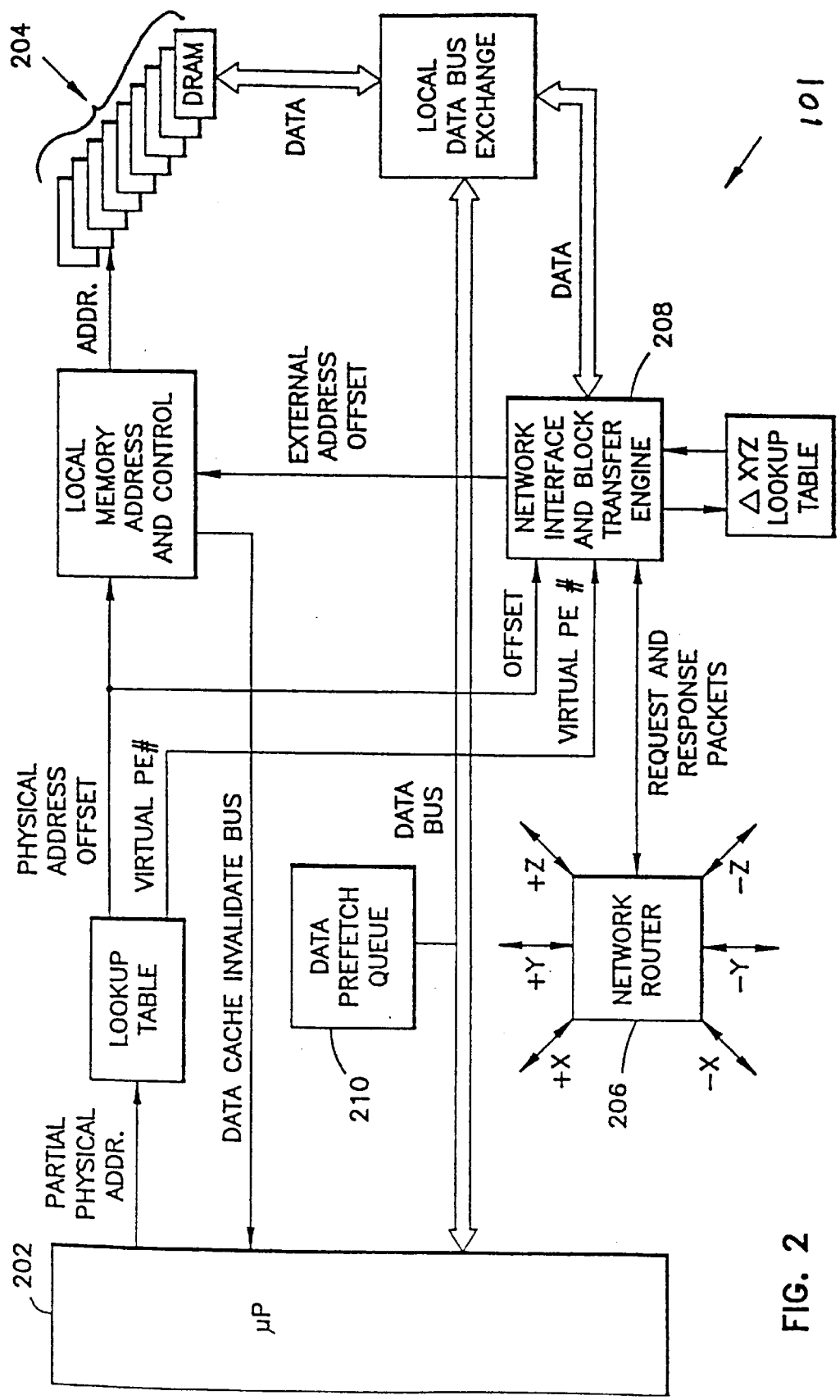
FIG. 2 shows a block diagram of a processing element (PE), including a processor, its associated shell circuitry, and local memory.
Figure 4A:
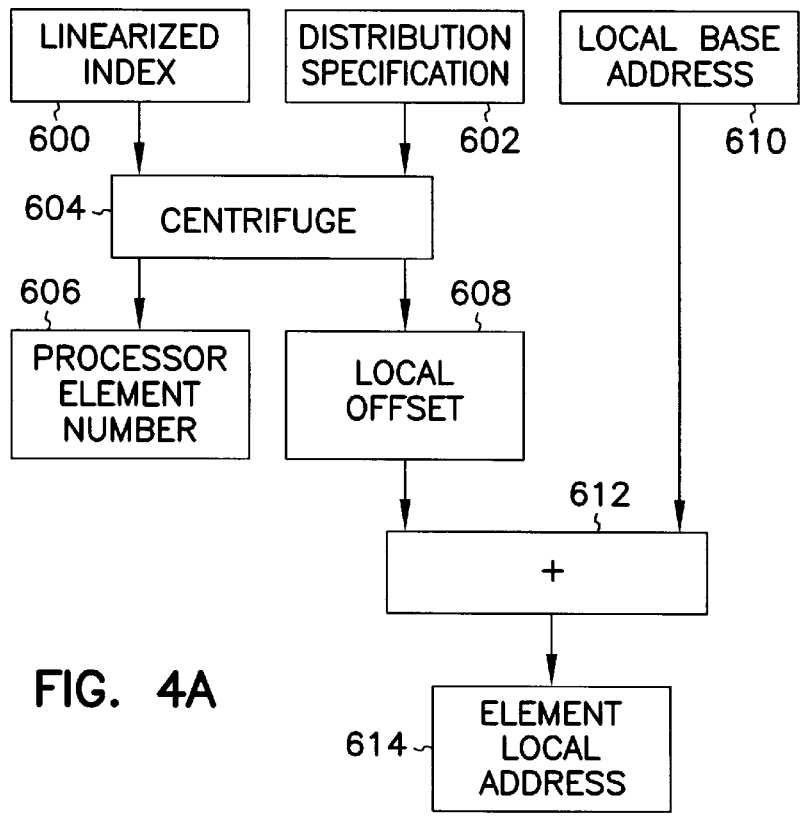
FIG. 4A shows a functional block diagram of a global address calculation.
Figure 4B:
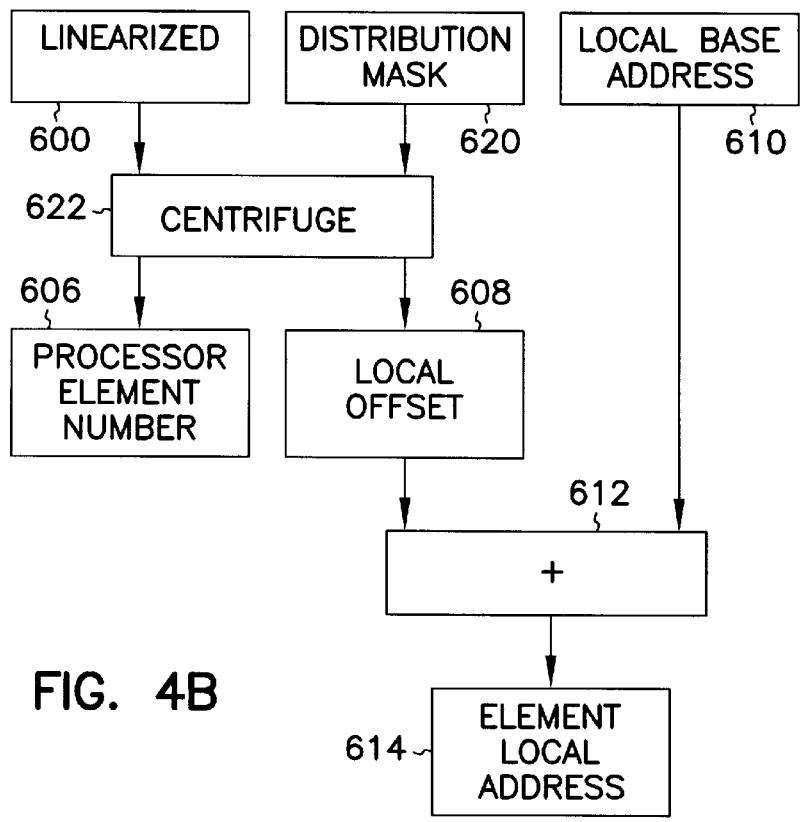
FIG. 4B shows a functional block diagram of one embodiment of a global address calculation with hardware assistance.
Figure 4C:
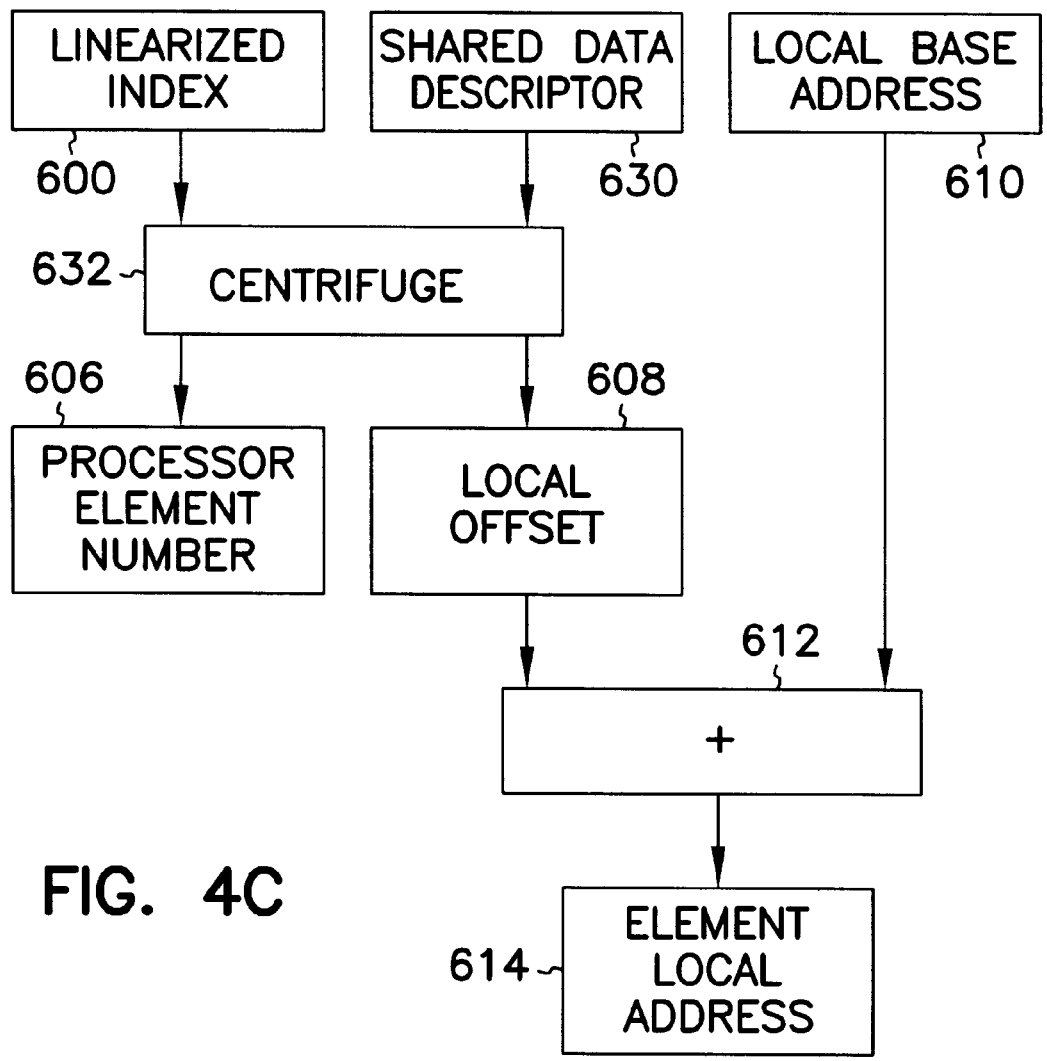
FIG. 4C shows a functional block diagram of one embodiment of a global address calculation in software.

FIG. 2 shows a simplified block diagram of a PE 200. An individual PE includes a high-performance RISC (reduced instruction set computer) microprocessor 202. In the preferred MPP system, microprocessor 202 is the DECChip 21064-AA RISC microprocessor, available from Digital Equipment Corporation. Each PE is coupled to a local memory 204 that is a distributed portion of the globally-addressable system memory, and includes a shell of circuitry that implements synchronization and communication functions facilitating interactions between processors.

The shell circuitry includes an interconnection network router 206, used to connect multiple PEs in a three-dimensional toroidal "fabric". The interconnection network carries all data communicated between PEs and memories that are not local. A block-transfer engine 208 in the PE shell circuitry permits asynchronous (i.e., independent of the local processor) movement of data between the local memory 204 and remote memories associated with other PEs, such as block transfers, with flexible addressing modes that permit a high degree of control over the redistribution of data between the distributed portions of the system memory. In one embodiment, the division address centrifuge resides in block-transfer engine 208. However, it shall be understood that the division address centrifuge may also be used directly by the processor in many other ways. The implementation of the address centrifuge as being used in the block transfer engine is for purposes of illustration only, and is not a limitation of the present invention.

The shell circuitry also includes a data prefetch queue 210 which allows the processor 202 to directly initiate data movement between remote memories and the local processor in a way that can hide the access latency and permit multiple remote memory references to be outstanding.

Synchronization circuits in the shell permit synchronization at various different levels of program or data granularity in order to best match the synchronization method that is "natural" for a given "parallelization" technique. At the finest granularity, data-level synchronization is facilitated by an atomic swap mechanism that permits the locking of data on an element-by-element basis. A more coarse-grain data-level synchronization primitive is provided by a messaging facility, which permits a PE to send a packet of data to another PE and to cause an interrupt upon message arrival, providing for the management of message queues and low-level messaging protocol in hardware. Control-level synchronization at the program-loop level is provided by a large set of globally accessible fetch-and-increment registers that can be used to dynamically distribute work (in the form of iterations of a loop, for instance) among processors at run time. Yet another form of control-level synchronization, barrier synchronization, is useful to control transitions between major program blocks (i.e., between loops performing actions on the same data sets). One barrier mechanism is described in detail in the copending and commonly assigned U.S. patent application entitled "BARRIER SYNCHRONIZATION FOR DISTRIBUTED MEMORY MASSIVELY PARALLEL PROCESSING SYSTEMS," Ser. No. 08/165,265, filed on Dec. 10, 1993 to Oberlin et al., now U.S. Pat. No. 5,434,995, which is incorporated herein by reference.

Data Distribution

An important concept in a distributed memory MPP system such as the one described herein is the fact that different processing tasks may profit from very different data distributions for most efficient processing performance. The present invention provides a system and method which allows the programmer to easily designate the optimal distribution of data in memory for a particular processing task.

The global address model permits data objects, such as scalars or arrays, distributed across all of the PEs, to be viewed as if there were a single address space. In one embodiment, data distribution is defined through a set of directives that indicate how a data object is distributed. Directives are used to aid portability and allow for migration to future standards for parallel execution. The directives are defined to allow dimensions of a shared array to be distributed in different manners. In one such embodiment, the declaration of a dimensionally distributed array is used to specify the distribution of array elements within each dimension and each dimension is distributed as if it were independent from all other dimensions. A programmer, therefore, has great flexibility in distributing data to increase the locality of data references.

In one such embodiment, distribution within each dimension is controlled by the distribution specifiers :BLOCK(N), :BLOCK and:. The distribution specifier :BLOCK(N) specifies a distribution in which N contiguous array elements are placed within a block, and the blocks are distributed among the assigned PEs. N is therefore the block size, or number of array elements in each block, of the distribution. In such a distribution, each PE owns the same number of blocks.

The distribution specifier :BLOCK specifies a block distribution where each PE owns exactly one block of contiguous elements. The distribution specifier: specifies a degenerate distribution in that dimension. That is, an entire dimension is distributed so that it is resident on a single PE.

FIG. 3A illustrates the :BLOCK(N) distribution of a thirteen element single-dimension array distributed across 4 PEs. In this example, block-size N is equal to one. Such a distribution may be requested using the following lines of parallel Fortran code:

|       | REAL A(13)          |
|-------|---------------------|
| CDIR$ | SHARED A( :BLOCK(1)) |

This kind of distribution is often referred to as a cyclic distribution because the elements of array A cycle individually through the PEs. That is, the elements of A are distributed so that contiguous elements are on adjacent PEs. It should be noted that, in this embodiment, no space is left for unassigned array elements 14 through 16. In one preferred embodiment, unassigned elements are not allocated automatically in order to round the extent of each array dimension to a power of two. This power-of-two restriction on the extent of array dimensions, and the methods used to ensure such, are detailed in the copending and commonly assigned U.S. patent application entitled "METHOD FOR THE DYNAMIC ALLOCATION OF ARRAY SIZES IN MULTIPROCESSOR SYSTEM," by MacDonald et al., Ser. No. 08/165,379 filed Dec. 10, 1993, which detail is incorporated herein by reference.

FIG. 3B illustrates the same array A but with a block-size N equal to two. Such distribution could be requested using the following parallel Fortran statements:

|       | REAL A(13)          |
|-------|---------------------|
| CDIR$ | SHARED A( :BLOCK(2)) |

This distribution places two contiguous elements in each block. As can be seen by comparing FIGS. 3A and 3B, such a distribution places a majority of the elements of A on different PEs than in the :BLOCK(1) distribution of FIG. 3A. Also, the unassigned elements are placed on different PEs.

FIG. 3C illustrates the default data distribution when a value of N is not specified. Such a distribution could be requested using the following parallel Fortran statements:

|       | REAL A(13)        |
|-------|-------------------|
| CDIR$ | SHARED A( :BLOCK) |

The block size for the :BLOCK distribution is such that a single contiguous block is assigned to each PE. That is, N is set to the extent of the dimension (rounded up to a power of two) divided by the number of PEs assigned to that dimension. Typically, the number of PEs assigned to a dimension is restricted to a power of 2 in order to make such calculations easier.

As stated above, each dimension of a multidimensional array can be distributed separately. FIG. 3E illustrates a two-dimensional array where both dimensions are distributed separately. Such a distribution could be requested using the following parallel Fortran statements:

|       | REAL D(8,8)              |
|-------|--------------------------|
| CDIR$ | SHARED D(:BLOCK, :BLOCK) |

In the example shown in FIG. 3E, array D is distributed across 16 PEs. When both dimensions of a two-dimensional array are distributed, the number of PEs is factored such that each dimension i is assigned a number of PEs, P[i]. In one embodiment, P[i] is restricted to being a power of two. As can be seen, each dimension has its own block size (B[i]). Since both dimensions of array D are distributed with the :BLOCK distribution, the block size is computed as follows:

| B[1]=E[1]/P[1] |
|----------------|
| B[2]=E[2]/P[2] | where E[i] is the extent of dimension i and P[i] is the number of PEs assigned to that dimension.

As stated above, each dimension of a multidimensional array can be distributed in a different manner. FIG. 3D illustrates a degenerate distribution in one dimension of a two-dimensional array and a default distribution in the second dimension. Such a two-dimensional array can be created and distributed in the following manner:

|       | REAL A(2,13)        |
|-------|---------------------|
| CDIR$ | SHARED A(:,:BLOCK)  |

The degenerate distribution allows an entire dimension to be assigned to one PE. This is useful when, for example, locality can be enhanced by placing an entire row or column of an array on a single PE. FIG. 3D illustrates the situation where a column from a two-dimensional array is assigned to each PE through a degenerate distribution.

Global Address Computation

To find the location within the toroidal mesh of an element of an array, one must determine the number of the PE to which that element has been assigned and the address within the local memory of that PE. The PE number and the local address together, therefore, describe a particular location in global memory. In the preferred embodiment, a PE number and local offset are encoded in the linearized index of the element. The local offset is combined with the local base address to form the local address of the element. The index must therefore be separated into its component parts, viz., PE number and local offset, and combined with the local base address within the PE prior to application to the torus network.

The present invention describes a method which simplifies the calculation of the global address, and includes the extraction of PE number and local offset from a linearized array index and distribution specification. Unlike other systems which sometimes restricted certain array data distributions to integer power-of-two numbers of PEs in order to improve the speed of calculating a PE number and offset for a particular element, the present invention provides for improved speed with any integer number of PEs in each dimension, thus providing more efficient utilization of memory with multidimensional arrays. In addition, the present invention describes a mechanism for accomplishing this calculation in software or in hardware while providing a high degree of flexibility as to which bits of the index are designated PE number bits and which are local offset bits. In one embodiment, a software program extracts the PE number and local offset from a linearized index in a manner to be described. In another embodiment, a division address centrifuge extracts PE number bits from the index under control of a software-supplied mask. In one series of embodiments, this masking is done in hardware in a manner to be described.

Division Address Centrifuge

An important concept in a distributed memory multiprocessing system such as the one described herein is the fact that different processing tasks may require many very different data distributions in memory in order to achieve the most efficient processing performance. The present invention provides the necessary hardware support which allows the programmer to easily designate the optimal distribution of data in memory for a particular processing task.

Because of the distributed nature of the memory in the preferred MPP system of the present invention, the physical address of a data element in the distributed memory can be characterized as having two parts: the PE number and the offset within the memory of the PE. The PE number and the offset together describe a particular location in the overall system memory. Address pointers to elements in memory are generated in the preferred MPP system as a single index address (the PE number and offset combined). The index address must be separated into its component parts, PE number and offset within the PE memory, prior to application to the torus network. The present invention includes a mechanism for accomplishing this separation with an extremely high level of flexibility with regard to the designation of which address ranges of the index are to be interpreted as the PE number, and which address differences are to be interpreted as offset.

This mechanism, a division address centrifuge, extracts the PE number from the index. This extraction can be performed under control of a software-supplied mask.

In one embodiment, the extent of each array dimension is not rounded up to a power-of-two, but instead the number representing each array dimension provides the denominator of a integer divide operation which is performed by the above described method. Since the array dimension is a fixed constant, this situation is amenable to the above method. For example, if a three-dimensional array having X, Y, and Z dimensions 20, 15, and 30 were to be distributed over a 7 PE by 19 PE subset of the MPP, one distribution would linearize the array index by multiplying the X index by 20×15, the Y index by 15, and adding these two products to the Z index to generate a linearized result. This result would be "divided" using the above method by 7, with the quotient specifying one index (PE index) of the 7 PE by 19 PE section, the remainder of the first "divide" would then be used as the numerator of a second divide by 19, with the quotient used as the second PE index of the 7 PE by 19 PE section, and the remainder being used as the offset into the local memory of that PE specified by the first and second PE indices.

It is to be understood that the above description is intended to be illustrative, and not restrictive. Many other embodiments, and many other ways of using the described embodiments, will be apparent to those of skill in the art upon reviewing the above description. The scope of the invention should, therefore, be determined with reference to the appended claims, along with the full scope of equivalents to which such claims are entitled.

What is claimed is:

1. A method for assisting address calculations for determining where each one of a plurality of data elements of an array is placed in a massively parallel processing system, each data element having both a home address associated with one processor in the system, and an offset address from a base address of the array within a memory of the one processor, the method comprising:

calculating the home address of an I th element of an array Y using a formula HOME(Y(I))=FLOOR((I−L)÷B) mod N;

calculating the offset address of the I th element of the array Y using a formula OFFSET(Y(I))=(I−L) mod B+FLOOR((I−L)÷(B×N))×B; and using the calculated home address and offset address by the system to access I th element of an array Y, wherein HOME is an identifying number of a processor associated with Y(I), I is an index into the array Y for which an address is to be generated, FLOOR(a÷b) represents truncated integer division of a by b, and L is a lowest allocated index of the array Y, B is a block size and is a positive integer, N is a number of processors allocated to this dimension and is a positive integer, and a mod b represents (in positive integers) the remainder of a/b; and wherein at least one divide (÷) operation includes the steps of:

calculating a reciprocal of a denominator;

multiplying a numerator by the reciprocal to generate a quotient, the quotient being a predetermined number of high-order bits of a product.

2. A method for address calculations for determining where each one of a plurality of data elements of a J th dimension of a multi-dimensional array is placed in a massively parallel processing system, each data element having both a home address associated with one processor in the system, and an offset address from a base address of the array within a memory of the one processor, the method comprising:

calculating the home address of an I th element of the J th dimension of an array A using a formula $$HOME_{A(J)}(I_J) = \lfloor (I_J - L_J)/B_J \rfloor \text{ MOD } N_J;$$

calculating the offset address of the I th element of the J th dimension of the array A using a formula $$OFFSET_{A(J)}(I_J) = (I_J - L_J) \text{ MOD } B_J + FLOOR(I_J - L_J)/(B_J \times N_J))B_J; \text{ and}$$

using the calculated home address and offset address in the system to access I th element of the J th dimension of the array A;
wherein
HOME is an identifying number of a processor associated with the I th element of the J th dimension of the array A,
I is an index into the array A for which an address is to be generated,
FLOOR(a÷b) represents truncated integer division of a by b, and
L is a lowest allocated index of the array A,
B is a block size and is a positive integer,
N is a number of processors allocated to this dimension and is a positive integer, and
a mod b represents (in positive integers) the remainder of a/b; and
wherein at least one divide (÷) operation includes the steps of:
calculating a reciprocal of a denominator;
multiplying a numerator by the reciprocal to generate a quotient, the quotient being a predetermined number of high-order bits of a product.

3. The method according to claim 1, further comprising:
linearizing a multi-dimensional array index of a multi-dimensional array into a linear offset I into the array Y(I) representing the multi-dimensional array.

4. The method according to claim 1, further comprising:
calculating the index I using a formula $$I = INDEX_A(P,W) = L + FLOOR(W/B) \, B \times N + B \times P + W \text{ mod } B$$

wherein
$I = INDEX_A(P,W)$ is the index I,
P is the identifying number of the processor associated with Y(I), and
W is the offset address of the I th element of the array Y within the memory of the processor P associated with Y(I).

5. The method according to claim 1, wherein calculating the reciprocal of the denominator is performed using a formula $$D = CEILING(2^K \div B) = FLOOR((2^K + B - 1) \div B) = FLOOR((2^K - 1) \div B) + 1$$

wherein
D is the denominator being calculated, and
K is a number of bits to be kept.

6. The method according to claim 1, wherein multiplying the numerator by the reciprocal to generate a quotient is performed using an unsigned integer multiply operation.

7. The method according to claim 2, further comprising:
calculating the index $I_J$ using a formula $$I_J = INDEX_{A(J)}(P_J, W_J) = L_J + FLOOR(W_J/B_J)B_J \times N_J + B_J \times P_J + W_J \text{ MOD } B_J$$

wherein
$I_J$ is the index I in the J th dimension of the element,
$P_J$ is the identifying number of the processor associated with the element, and
$W_J$ is the offset address of the I th element of the J th dimension of array A within the memory of the processor $P_J$ associated with the element.

8. The method according to claim 2, wherein calculating the reciprocal of the denominator is performed using a formula $$D = CEILING(2^K \div B) = FLOOR((2^K + B - 1) \div B) = FLOOR((2^K - 1) \div B) + 1$$

wherein
D is the denominator being calculated, and
K is a number of bits to be kept.

9. The method according to claim 2, wherein multiplying the numerator by the reciprocal to generate a quotient is performed using an unsigned integer multiply operation.

10. The method according to claim 2, wherein PE and offset values for each dimension are be reduced to a single PE value and a single offset value, which is done by equations:

$$P = HOME_A(\vec{I}) = \sum_{j=1}^{r} \left( P_j \prod_{k=1}^{j-1} N_k \right)$$

$$W = OFFSET_A(\vec{I}) = \sum_{j=1}^{r} \left( W_j \prod_{k=1}^{j-1} \left\lceil \frac{1 + U_k - L_k}{N_k} \right\rceil \right)$$

11. An apparatus for address calculations for determining where each of a plurality of data elements is placed in a massively parallel processing system, each data element having both a home address associated with one processor in the system, and an offset address within a memory of the one processor, the apparatus comprising:
means for calculating the home address of an I th element of an array Y using a formula $$HOME(Y(I)) = FLOOR((I-L) \div B) \text{ mod } N;$$

means for calculating the offset address of the I th element of the array Y using a formula $$OFFSET(Y(I)) = (I-L) \text{ mod } B + FLOOR((I-L) \div (B \times N)) \times B; \text{ and}$$

means for using the calculated home address and offset address by the system to access I th element of an array Y;
wherein
HOME is an identifying number of a PE associated with Y(I),
I is an index into the array Y for which an address is to be generated,
FLOOR(a÷b) represents truncated integer division of a by b, and L is a lowest allocated index of the array Y, B is a block size and is a positive integer, N is a number of processors allocated to this dimension and is a positive integer, and a mod b represents (in positive integers) the remainder of a/b; and wherein at least one divide (÷) operation includes the steps of:
  calculating a reciprocal of a denominator;
  multiplying a numerator by the reciprocal to generate a quotient, the quotient being a predetermined number of high-order bits of a product.

12. The apparatus according to claim 11, further comprising:
  means for linearizing a multi-dimensional array index of a multi-dimensional array into a linear offset I into the array Y(I) representing the multi-dimensional array.

13. The apparatus according to claim 11, further comprising:
  means for calculating the index I using a formula $$I=INDEX_A(P,W)=L+FLOOR(W/B)B \times N+B \times P+W \bmod B$$

wherein

I=$INDEX_A$(P,W) is the index I,

P is the identifying number of the processor associated with Y(I), and

W is the offset address of the I th element of the array Y within the memory of the processor P associated with Y(I).

14. The apparatus according to claim 11, wherein means for calculating the reciprocal of the denominator is performed using a formula $$D=CEILING(2^K \div B)=FLOOR((2^K+B-1) \div B)=FLOOR((2^K-1) \div B)+1$$

wherein

D is the denominator being calculated, and

K is a number of bits to be kept.

15. The apparatus according to claim 11, wherein means for multiplying the numerator by the reciprocal to generate a quotient uses an unsigned integer multiply operation.

16. An apparatus for address calculations for determining where each one of a plurality of data elements of a J th dimension of a multi-dimensional array is placed in a massively parallel processing system, each data element having both a home address associated with one processor in the system, and an offset address from a base address of the array within a memory of the one processor, the apparatus comprising:
  means for calculating the home address of an I th element of the J th dimension of an array A using a formula $$HOME_{A(J)}(I_J)=\lfloor(I_J-L_J)/B_J\rfloor \bmod N_J;$$

means for calculating the offset address of the I th element of the J th dimension of the array A using a formula $$OFFSET_{A(J)}(I_J)=(I_J-L_J) \bmod B_J+FLOOR((I_J-L_J)/(B_J \times N_J))B_J; \text{ and}$$

means for using the calculated home address and offset address in the system to access the I th element of the array A;

wherein

HOME is an identifying number of a processor associated with the I th element in the J th dimension of array A, I is an index in the J th dimension into the array A for which an address is to be generated, FLOOR(a÷b) represents truncated integer division of a by b, and L is a lowest allocated index of the array A, B is a block size and is a positive integer, N is a number of processors allocated to this dimension and is a positive integer, and a mod b represents (in positive integers) the remainder of a/b; and wherein at least one divide (÷) operation includes the steps of:
  calculating a reciprocal of a denominator;
  multiplying a numerator by the reciprocal to generate a quotient, the quotient being a predetermined number of high-order bits of a product.

17. The apparatus according to claim 16, further comprising:
  calculating the index $I_J$ using a formula $$I=INDEX_{A(J)}(P_J,W_J)=L_J+FLOOR(W_J/B_J)B_J \times N_J+B_J \times P_J+W_J \bmod B_J$$

wherein $I_J$ is the index I in the J th dimension of the element, $P_J$ is the identifying number of the processor associated with the element, and $W_J$ is the offset address of the I th element of the J th dimension of array A within the memory of the processor $P_J$ associated with the element.

18. The apparatus according to claim 16, wherein
calculating the reciprocal of the denominator is performed using a formula $$D=CEILING(2^K \div B)=FLOOR((2^K+B-1) \div B)=FLOOR((2^K-1) \div B)+1$$

wherein

D is the denominator being calculated, and

K is a number of bits to be kept.

19. The apparatus according to claim 16, wherein multiplying the numerator by the reciprocal to generate a quotient is performed using an unsigned integer multiply operation.

20. The apparatus according to claim 16, wherein PE and offset values for each dimension are be reduced to a single PE value and a single offset value, which is done by equations:

$$P = HOME_A(\vec{I}) = \sum_{j=1}^{r} \left( P_J \prod_{k=1}^{j-1} N_k \right)$$

$$W = OFFSET_A(\vec{I}) = \sum_{j=1}^{r} \left( W_J \prod_{k=1}^{j-1} \left\lceil \frac{1+U_k-L_k}{N_k} \right\rceil \right)$$

* * * * *

UNITED STATES PATENT AND TRADEMARK OFFICE
CERTIFICATE OF CORRECTION

PATENT NO.: 5,900,023
DATED: May 4, 1999
INVENTOR(S): Pase

It is certified that errors appear in the above-identified patent and that said Patent is hereby corrected as shown below:

In column 6, line 55, delete "(a- b)" and insert --(a÷b)--, therefor.

In column 14, line 25, delete "assisting".

In column 15, line 11, delete "$OFFSET_{A(j)}(I_j)=(I_j-L_j) MOD\ B_j+FLOOR(I_j-L_j)/(B_j \times N_j))B_j$; and"

and insert -- $OFFSET_{A(j)}(I_j)=(I_j-L_j) MOD\ B_j+FLOOR((I_j-L_j)/(B_j \times N_j))B_j$; and --, therefor.

In column 16, line 29, delete "be".

In column 18, line 54, delete "be".

Signed and Sealed this

Ninth Day of May, 2000

*Attest:*

Q. TODD DICKINSON

*Attesting Officer*    *Director of Patents and Trademarks*